US008645475B2

(12) United States Patent
Akita et al.

(10) Patent No.: US 8,645,475 B2
(45) Date of Patent: Feb. 4, 2014

(54) IMAGE TRANSMISSION DEVICE, IMAGE TRANSMISSION SYSTEM, AND IMAGE TRANSMISSION METHOD

(75) Inventors: Katsuhiko Akita, Amagasaki (JP); Minako Kobayashi, Ikeda (JP); Hirohisa Miyamoto, Kobe (JP); Takehisa Yamaguchi, Ikoma (JP); Okihisa Yoshida, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1215 days.

(21) Appl. No.: 12/243,241

(22) Filed: Oct. 1, 2008

(65) Prior Publication Data

US 2009/0094254 A1   Apr. 9, 2009

(30) Foreign Application Priority Data

Oct. 5, 2007   (JP) .................. 2007-262281

(51) Int. Cl.
*G06F 15/16*   (2006.01)

(52) U.S. Cl.
USPC ........................................... 709/206

(58) Field of Classification Search
None
See application file for complete search history.

(56) References Cited

U.S. PATENT DOCUMENTS

| | | | | |
|---|---|---|---|---|
| 5,742,769 A | * | 4/1998 | Lee et al. | 709/206 |
| 6,108,691 A | * | 8/2000 | Lee et al. | 709/206 |
| 2001/0042103 A1 | * | 11/2001 | Tomari et al. | 709/206 |
| 2008/0021962 A1 | * | 1/2008 | Ryan et al. | 709/206 |

FOREIGN PATENT DOCUMENTS

| | | |
|---|---|---|
| JP | 2003-108479 | 4/2003 |
| JP | 2003-244308 | 8/2003 |
| JP | 2004-222141 A | 8/2004 |
| JP | 2005-026876 A | 1/2005 |
| JP | 2006-186919 A | 7/2006 |
| JP | 2006186919 A * | 7/2006 |

OTHER PUBLICATIONS

Decision to Grant a Patent in JP 2007-262281 dated Sep. 8, 2009, and an English Translation thereof.

* cited by examiner

*Primary Examiner* — Thomas Dailey
*Assistant Examiner* — Nam Tran
(74) *Attorney, Agent, or Firm* — Buchanan Ingersoll & Rooney PC

(57) ABSTRACT

An image transmission system includes an image transmission device and a server that provides recipient information including recipient specification information and a transmission method and destination for image data. The server records, in association with a recipient identifier, recipient-designated recipient information and display mode designation information indicating a display mode for the recipient information. Each time the recipient information and display mode designation information is updated, the server overwrites the recorded information with the updated recipient information and display mode designation information. The image transmission device receives a selection of a recipient identifier for image data transmission, and if the selected recipient identifier is associated with the recipient information and display mode designation information in the server, acquires such information from the server, and when transmitting image data based on the recipient information, displays the recipient information according to a display mode indicated in the acquired display mode designation information.

9 Claims, 18 Drawing Sheets

RECIPIENT SETTING INFORMATION

RECIPIENT SPECIFICATION INFORMATION:
RECIPIENT NAME   GK
RECIPIENT ID     111998
NICKNAME         GORI
FACE IMAGE       STORAGE LOCATION

TRANSMISSION METHOD:   DESTINATION:
E-mail                 ddd@jjj.ne.jp

DISPLAY MODE: INDIVIDUAL RESTRICTED

| | PERSON A | PERSON B | PERSON C | PERSON H |
|---|---|---|---|---|
| RECIPIENT NAME | × | ○ | ○ | × |
| RECIPIENT ID | × | ○ | ○ | × |
| NICKNAME | ○ | × | × | × |
| FACE IMAGE | ○ | × | × | ○ |
| TRANSMISSION METHOD | ○ | ○ | ○ | ○ |
| DESTINATION | ○ | × | ○ | × |

FIG. 4

RECIPIENT SETTING INFORMATION

RECIPIENT SPECIFICATION INFORMATION:

| RECIPIENT NAME | GK |
| RECIPIENT ID | 111998 |
| NICKNAME | GORI |
| FACE IMAGE | STORAGE LOCATION |

TRANSMISSION METHOD:     DESTINATION:

E-mail                   ddd@jjj.ne.jp

DISPLAY MODE: INDIVIDUAL RESTRICTED

| | PERSON A | PERSON B | PERSON C | PERSON H |
|---|---|---|---|---|
| RECIPIENT NAME | × | ○ | ○ | × |
| RECIPIENT ID | × | ○ | ○ | × |
| NICKNAME | ○ | × | × | × |
| FACE IMAGE | ○ | × | × | ○ |
| TRANSMISSION METHOD | ○ | ○ | ○ | ○ |
| DESTINATION | ○ | × | ○ | × |

FIG.7A

PERSON A'S ADDRESS BOOK

| RECIPIENT NAME | TRANSMISSION METHOD | DESTINATION |
|---|---|---|
| PERSON GK | AUTO SETTING INFORMATION | |
| PERSON C | E-mail | ccc@ppp.gr.jp |
| PERSON D | E-mail | dff@jjj.ne.jp |
| PERSON E | FAX | xxx-yyyy-zzzz |
| . . . . | . . . . | |

FIG.7B

PERSON GK'S ADDRESS BOOK

| RECIPIENT NAME | TRANSMISSION METHOD | DESTINATION |
|---|---|---|
| PERSON A | FTP | xxx.yyy.zzz.www |
| PERSON B | E-mail | bbb@ppp.gr.jp |
| PERSON C | E-mail | ccc@ppp.gr.jp |
| PERSON H | FAX | hhh-iiii-zzzz |
| . . . . | | |

401

RECIPIENT SPECIFICATION INFORMATION
. . . . .
. . . . .
. . . . .
. . . . .
. . . . .

FIG.9A

TRANSMISSION HISTORY INFORMATION

| SENDER NAME | RECIPIENT SPECIFICATION INFORMATION | TRANSMISSION METHOD | DESTINATION | TRANSMISSION RESULT | TRANSMISSION TIME |
|---|---|---|---|---|---|
| PERSON A | GORI | E-mail | ddd@jjj.ne.jp | SUCCESSFUL | 12/12/2007 17:12 |

FIG.9B

TRANSMISSION HISTORY INFORMATION

| SENDER NAME | RECIPIENT SPECIFICATION INFORMATION | TRANSMISSION METHOD | DESTINATION | TRANSMISSION RESULT | TRANSMISSION TIME |
|---|---|---|---|---|---|
| PERSON H | | E-mail | | SUCCESSFUL | 12/12/2007 17:12 |

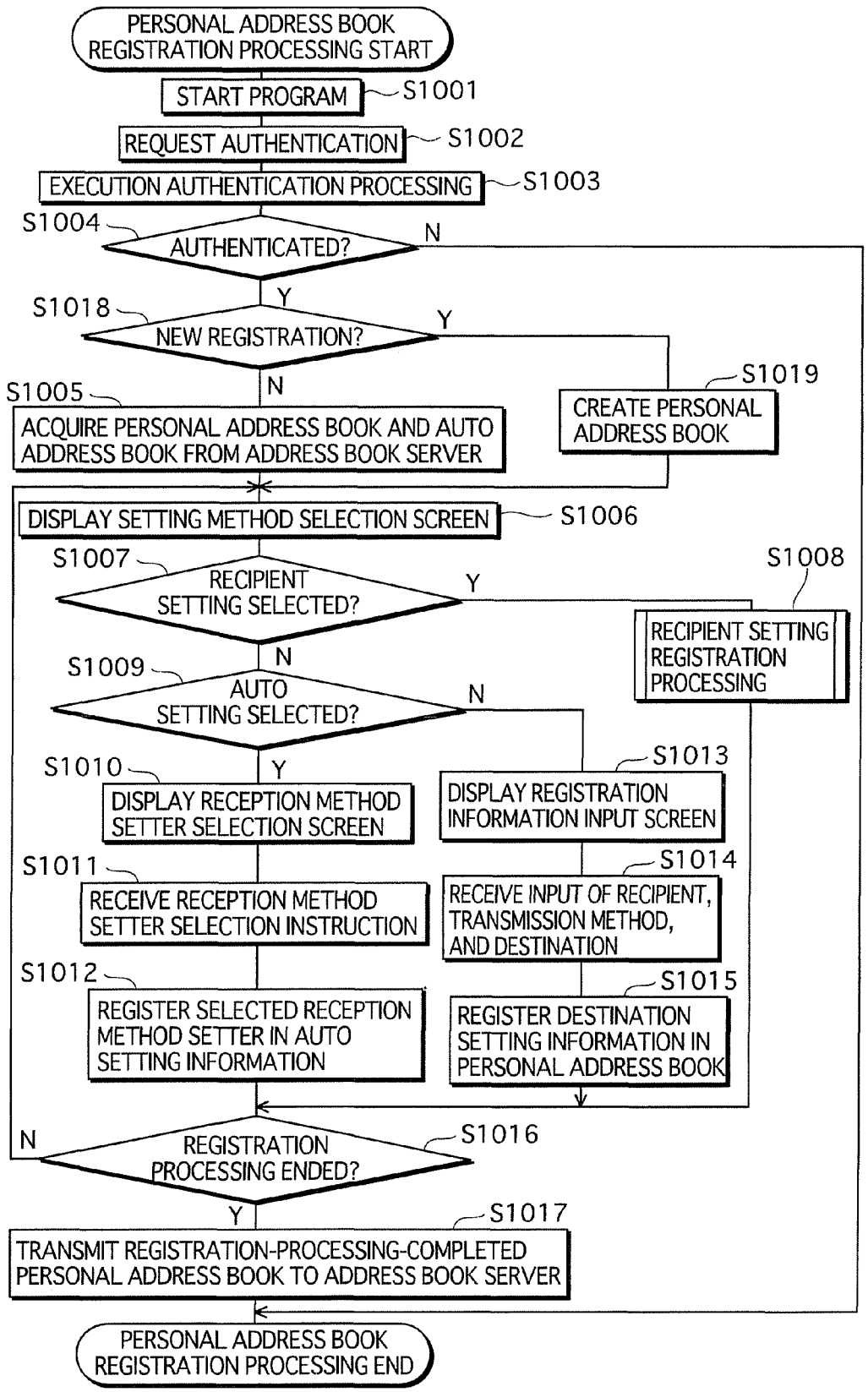

FIG.19A

RECIPIENT SETTING INFORMATION INPUT SCREEN

RECIPIENT SPECIFICATION INFORMATION:

RECIPIENT NAME  GK
RECIPIENT ID    ?
NICKNAME
FACE IMAGE

TRANSMISSION METHOD:        DESTINATION:

E-mail                      ddd@jjj.ne.jp

DISPLAY MODE:

☐ UNRESTRICTED
☐ ALL RESTRICTED
☒ INDIVIDUAL RESTRICTED

FIG.19B

INDIVIDUAL DESIGNATION SCREEN

|                     | PERSON A | PERSON B | PERSON C | OTHER |
|---------------------|----------|----------|----------|-------|
| RECIPIENT NAME      | ○ ?      |          |          |       |
| RECIPIENT ID        |          |          |          |       |
| NICKNAME            |          |          |          |       |
| FACE IMAGE          |          |          |          |       |
| TRANSMISSION METHOD |          |          |          |       |
| DESTINATION         |          |          |          |       |

FIG.19C

ALL RESTRICTED DESIGNATION SCREEN

RECIPIENT NAME      ○ ?
RECIPIENT ID
NICKNAME
FACE IMAGE
TRANSMISSION METHOD
DESTINATION

FIG.20

```
RECIPIENT NAME SELECTION SCREEN

SELECT A RECIPIENT NAME
  ┌─────────┐
  │PERSON GK│
  └─────────┘
  PERSON C
  PERSON D
  PERSON E
   . . . .
                          ┌──────┐
   . . . .                │SELECT│
                          └──────┘
```

FIG.21

| SENDER: PERSON H | |
|---|---|
| DESTINATION REGION INFORMATION | TRANSMISSION METHOD |
| OSAKA | FAX |

IMAGE TRANSMISSION DEVICE, IMAGE TRANSMISSION SYSTEM, AND IMAGE TRANSMISSION METHOD

This application is based on an application No. 2007-262281 filed in Japan, the content of which is hereby incorporated by reference.

BACKGROUND OF THE INVENTION

1. Field of the Invention

The present invention relates to image transmission technology in which address information can be displayed, and in particular to technology for controlling the display of address information when transmission is performed.

2. Description of the Related Art

Recent years have seen the widespread use of image transmission devices that can transmit various types of information via a network to a recipient by a transmission method that a user desires (E-mail, fax, FTP, Internet fax, etc.).

It is common in such image transmission devices for a recipient's address information (the recipient's name, fax number, E-mail address, etc.) to be displayed on a display when image data is transmitted. Since it is possible for a person who has no connection with the sender to see such address information, there is disclosed technology for preventing information leaks by controlling the display of address information.

For example, Japanese Patent Application Publication No. 2006-186919 discloses technology for restricting the time for which address information is displayed and masking parts of address information.

Such technology raises security such that important address information regarding a client etc. cannot be easily seen by others or leaked when transmitting image data.

However, since the display of a recipient's address information is controlled according to the intentions of the sender in the above conventional technology, the intentions of the recipient are not taken into account at all, and when image data is transmitted, information that the recipient does not want to be displayed may in fact be displayed, and such information may be leaked to others and used without authorization, which is disadvantageous to the recipient.

For example, in a case such as when image data is exchanged between employees at the same company, there is no particular need for the sender to restrict the display of the recipient's address information, and therefore the display of address information is often not restricted when performing transmission. However, there are cases such as when due to the recipient's circumstances the recipient is visiting an important client and wants to receive image data etc. at the client location, or is working at home and wants to receive image data etc. In such cases, even though the recipient would want the sender to restrict the display of address information for the sake of ensuring security and protecting private information, the sender would not be aware of the recipient's circumstances, and if the address information were displayed without any restrictions and fully disclosed, the address information could be leaked, which would be disadvantageous to the recipient.

SUMMARY OF THE INVENTION

In view of the above problems, an aim of the present invention is to provide an image transmission device in which, when image data is transmitted to a recipient, the disclosure of address information can be controlled in accordance with the intentions of the recipient, as well as an image transmission system including such image transmission device, and an image transmission method.

In order to solve the above problems, one aspect of the present invention is an image transmission system including a server and an image transmission device that are connected via a network, the server providing recipient information which includes recipient specification information that specifies a recipient, and a transmission method and a destination for transmission of image data to the recipient, the server including: a recording medium; a registration/update reception unit operable to receive recipient information and display mode designation information for registration or updating, the display mode designation information designating a display mode for the recipient information, and the recipient information and the display mode designation information having been designated by the recipient; and a recording controller operable to, upon reception of the recipient information and display mode designation information for registration, record the recipient information and display mode designation information for registration to the recording medium in association with a recipient identifier that identifies the recipient who designated the recipient information and display mode designation information for registration, and upon reception of the recipient information and display mode designation information for updating, to overwrite the recipient information and display mode designation information recorded to the recording medium in association with the recipient identifier, with the recipient information and display mode designation information for updating, and the image transmission device including: a display; a selection reception unit operable to receive a selection of a recipient identifier that identifies a recipient who is to receive image data; an acquisition unit operable to, if the selected recipient identifier is recorded in the server in association with recipient information and display mode designation information, acquire, from the server, the recipient information and display mode designation information associated with the selected recipient identifier; a transmitter operable to transmit the image data in accordance with the acquired recipient information; and a display controller operable to control the display to display the recipient information associated with the selected recipient identifier, in accordance with the display mode designated in the display mode designation information associated with the selected recipient identifier.

Another aspect of the present invention is an image transmission device connected to a server via a network, the server providing recipient information which includes a transmission method and a destination for transmission of image data to a recipient and recipient specification information that specifies the recipient, and performing processing for recording, in association with an identifier of the recipient, recipient-designated recipient information and display mode designation information designating a display mode for the recipient information, and each time the recipient information and display mode designation information are updated, overwriting the recorded recipient information and display mode designation information with the recipient information and display mode designation information for updating, the image transmission device including: a display; a selection reception unit operable to receive a selection of a recipient identifier that identifies a recipient who is to receive image data; an acquisition unit operable to, if the selected recipient identifier is recorded in the server in association with recipient information and display mode designation information, acquire, from the server, the recipient information and display mode designation information associated with the selected recipient identifier; a transmitter operable to transmit the image data in accordance with the acquired recipient information; and a display controller operable to control the display to display the recipient information associated with the selected recipient identifier, in accordance with the display mode designated in the display mode designation information associated with the selected recipient identifier.

A further aspect of the present invention is an image transmission method used in an image transmission device that includes a display and is connected to a server via a network, the server providing recipient information which includes a transmission method and a destination for transmission of image data to a recipient and recipient specification information that specifies the recipient, and performing processing for recording, in association with an identifier of the recipient, recipient-designated recipient information and display mode designation information designating a display mode for the recipient information, and each time the recipient information and display mode designation information are updated, overwriting the recorded recipient information and display mode designation information with the recipient information and display mode designation information for updating, the image transmission method including the steps of: receiving a selection of a recipient identifier that identifies a recipient who is to receive image data; if the selected recipient identifier is recorded in the server in association with recipient information and display mode designation information, acquiring, from the server, the recipient information and display mode designation information associated with the selected recipient identifier; transmitting the image data in accordance with the acquired recipient information; and controlling the display to display the recipient information associated with the selected recipient identifier, in accordance with the display mode designated in the display mode designation information associated with the selected recipient identifier.

According to the above structure, when image data transmission is performed, recipient information is displayed on the display of the image transmission device in accordance with the display mode designated by the recipient, thereby enabling the recipient to restrict at his/her discretion the display of information that he/she does not want to be displayed, such the recipient's name and destination. Accordingly, when image data is transmitted to the recipient, the disclosure of the recipient's address information on the image transmission device is restricted in accordance with the recipient's intentions, thus effectively preventing information disclosure that is disadvantageous to the recipient.

Here, the display mode designation information may include a plurality of display modes for the recipient information, each being associated with a different sender identifier, the image transmission device may further include: a sender identifier input reception unit operable to receive an input of a sender identifier; and a display mode specifier operable to, if the selected recipient identifier is recorded in the server in association with recipient information and display mode designation information, specify, from among the plurality of display modes in the acquired display mode designation information, the display mode associated with the input sender identifier, and the display controller may control the display to display the recipient information associated with the selected recipient identifier, in accordance with the specified display mode.

Also, the display mode designation information may include a plurality of display modes for the recipient information, each being associated with a different sender identifier, the image transmission method may further include the steps of: receiving an input of a sender identifier; and if the selected recipient identifier is recorded in the server in association with recipient information and display mode designation information, specifying, from among the plurality of display modes in the acquired display mode designation information, the display mode associated with the input sender identifier, and in the display control step, the display may be controlled to display the recipient information associated with the selected recipient identifier, in accordance with the specified display mode.

According to this structure, the display mode for recipient information to be displayed when transmitted is performed can be different according to the sender, thereby enabling the display mode for address information to be optimized according to the level of familiarity, client-relationship, or the like with each sender, so as to not cause a disadvantageous situation for the recipient.

Here, the image transmission device may further include: a history recording medium operable to record therein one or more transmission history information pieces, each including a sender identifier, a recipient identifier, a transmission result, and recipient information; a display instruction reception unit operable to receive a transmission history information display instruction; and a judgment unit operable to, upon reception of the transmission history information display instruction, judge whether the recipient identifier indicated in the transmission history information piece that includes the input sender identifier is recorded in the server in association with recipient information and display mode designation information, if the judgment unit judges affirmatively, the acquisition unit may acquire, from the server, the display mode designation information associated with the recipient identifier indicated in the transmission history information piece, and the display controller may control display of the transmission history information piece such that the recipient information included therein is displayed on the display in accordance with, from among the plurality of display modes in the acquired display mode designation information, the display mode associated with the input sender identifier.

Also, the image transmission device may further include: a history recording medium operable to record therein one or more transmission history information pieces, each including a sender identifier, a recipient identifier, a transmission result, and recipient information, the image transmission method may further include the steps of: receiving a transmission history information display instruction; and upon reception of the transmission history information display instruction, judging whether the recipient identifier indicated in the transmission history information piece that includes the input sender identifier is recorded in the server in association with recipient information and display mode designation information, if the judgment unit judges affirmatively, in the acquisition step the display mode designation information associated with the recipient identifier indicated in the transmission history information piece may be acquired from the server, and in the display control step, display of the transmission history information piece may be controlled such that the recipient information included therein is displayed on the display in accordance with, from among the plurality of display modes in the acquired display mode designation information, the display mode associated with the input sender identifier.

According to this structure, even in the display of transmission history information, recipient information is displayed in accordance with the display mode designated by the recipient, thereby effectively preventing information disclosure via the transmission history information display that is disadvantageous to the recipient.

BRIEF DESCRIPTION OF THE DRAWINGS

These and other objects, advantages, and features of the invention will become apparent from the following description thereof taken in conjunction with the accompanying drawings, which illustrate a specific embodiment of the present invention.

In the drawings:

FIG. 4 shows a concrete example of recipient setting information;

FIGS. 7A and 7B show concrete examples of personal address books;

FIGS. 9A and 9B show concrete examples of transmission history information displayed by a display 1171 as a result of transmission history display processing;

FIG. 10 is a flowchart showing operations in personal address book registration processing performed by a controller 119;

FIGS. 19A to 19C show concrete examples of a recipient setting information input screen;

FIG. 20 shows a concrete example of a recipient name selection screen; and

FIG. 21 shows an exemplary display in a case in which the display of information other than the transmission method is restricted in display mode designation information.

DESCRIPTION OF THE PREFERRED EMBODIMENT

The following describes a preferred embodiment for implementing the present invention.

Structure

Figure 1:
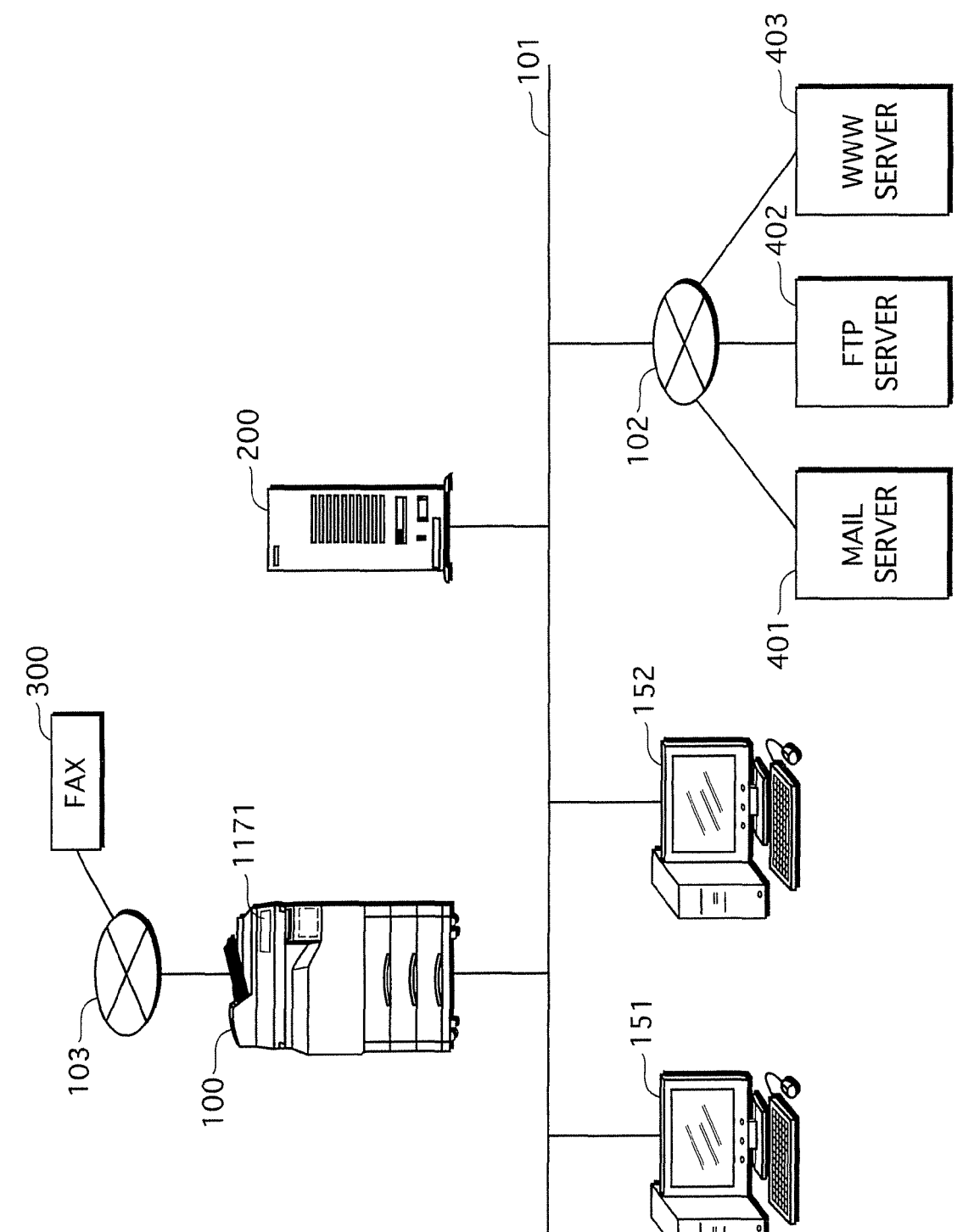
FIG. 1 shows the structure of an image transmission system 1000 pertaining to the embodiment.

FIG. 1 shows the structure of an image transmission system 1000 pertaining to the present embodiment. The image transmission system 1000 is constituted from an image transmission device 100, personal computers (hereinafter, each is called a "PC") 151 and 152, and an address book server 200. Such constituent elements of the image transmission system 1000 are connected together via a LAN (Local Area Network) 101.

The LAN 101 is connected to an internet 102, and the image transmission system 1000 is connected to a mail server 401, an FTP server 402, and a WWW server 403 via the internet 102.

The constituent elements connected to the LAN 101 and the internet 102 are interconnected in accordance with TCP/IP (Transport Control Protocol/Internet Protocol). In TCP/IP, various types of communication are possible by WebDAV (Distribute Authoring and Versioning for the WWW), SMB (Server Message Block), SMTP (Simple Mail Transport Protocol), and FTP (File Transfer Protocol).

Also, the image transmission device 100 is connected to a communication net 103 that is constituted from a telephone line or the like, and can perform fax communication with an external fax 300 via the communication net 103.

Note that although only one image transmission device 100 is depicted in FIG. 1 for the sake of simplicity, the image transmission system 1000 may include a plurality of image transmission devices 100.

Image Transmission Device 100

Hardware Structure

The image transmission device 100 of the present embodiment is constituted from, for example, a microprocessor, a ROM, a RAM, a hard disk unit, an operation panel (a panel including, for example, a touch panel or input keys and an LCD (Liquid Crystal Display)) for the input of instructions, a scanner, a fax, and a printer composed of an image printing device such as a laser printer. A computer program is stored in the RAM or the hard disk unit. The image transmission device 100 achieves the functions described below in the functional structure as the microprocessor operates in accordance with the computer program. Here, the computer program is constituted from combinations of instruction code indicating instructions for a computer, in order to achieve predetermined functions.

Functional Structure

Figure 2:
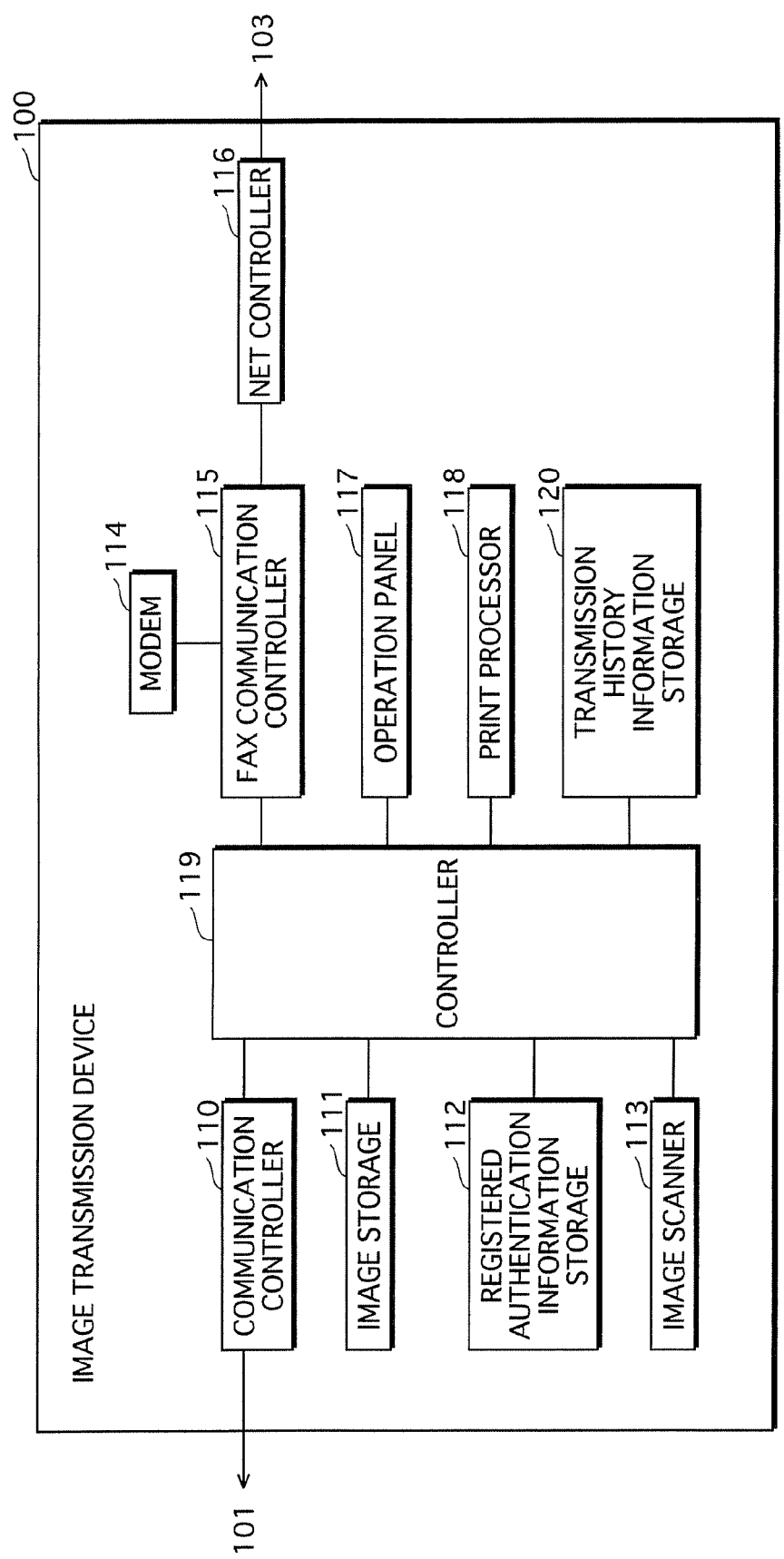
FIG. 2 is a functional block diagram showing the functional structure of an image transmission device 100.

FIG. 2 is a functional block diagram showing the functional structure of the image transmission device 100. As shown in FIG. 2, the image transmission device 100 is constituted from a communication controller 110, an image storage 111, a registered authentication information storage 112, an image scanner 113, a modem 114, a FAX communication controller 115, a net controller 116, an operation panel 117, a print processor 118, a controller 119, and a transmission history information storage 120.

Communication Controller 110

The communication controller 110 is an interface for connecting to the LAN 101. The communication controller 110 controls communication with the constituent elements of the image transmission system 1000 that are connected to the LAN 101. The communication controller 110 performs the communication control using a predetermined protocol such as TCP/IP.

Image Storage 111

The image storage 111 stores image data for transmission that has been received as input from the image scanner 113 or the communication controller 110.

Registered Authentication Information Storage 112

The registered authentication information storage 112 stores registered authentication information and face image data indicating a face image, for users that have been pre-registered as authorized users of the image transmission device 100.

"Registered authentication information" refers to information constituted from the usernames and passwords of the authorized users.

Each piece of face image data is stored in association with a corresponding username.

Image Scanner 113

The image scanner 113 is constituted from an image input device such as a scanner. The image scanner 113 irradiates text, a drawing, a chart, a photograph, or image such as a photograph recorded on a paper document with an internal light source, forms a reflected image on a solid state image pickup element with the use of a lens, converts the reflected image into an image signal via the solid-state image pickup element, and generates image data.

Modem 114

The modem 114 is used to modulate a transmission signal to be transmitted to another image transmission device 100 and demodulate a transmission signal received from the other image transmission device 100.

FAX Communication Controller 115

The FAX communication controller 115 performs, via the modem 114, the modulation of a transmission signal to be transmitted to another image transmission device 100 and the demodulation of a transmission signal received from the other image transmission device 100.

Also, the FAX communication controller 115 connects to the communication net 103 via the net controller 116, and performs communication with another image transmission device 100.

Net Controller 116

The net controller 116 is used to connect to the communication net 103.

Operation Panel 117

The operation panel 117 includes input keys and a display (e.g., an LCD) indicated by 1171 in FIG. 1, and a touch panel is provided on the surface of the display 1171. The operation panel 117 receives instructions from a user by touch input via the touch panel or key input via the input keys, and notifies the received instructions to the controller 119.

Print Processor 118

The print processor 118 performs printing to a printing sheet based on image data received from the controller 119.

Controller 119

The controller 119 performs overall control of the image transmission device 100, as well as personal address book registration processing, recipient setting registration processing, image transmission processing, and transmission history display processing, which are described later.

Transmission History Information Storage 120

The transmission history information storage 120 stores transmission history information.

"Transmission history information" refers to information indicating a correspondence between a sender name, a recipient name or later-described recipient specification information, a transmission method or later-described transmission condition designation information, a transmission result, and a transmission time. A piece of transmission history information is created by the controller 119 each time image data is transmitted to a destination.

"Transmission method" refers to information regarding a transmission protocol (e.g., WebDAV, SMB, SMTP, or FTP) or transmission function (e.g., fax), and "destination" refers to information indicating an address (e.g., network address or phone number) to which image data is to be transmitted.

Address Book Server 200

Hardware Structure

The address book server 200 is constituted from, for example, a microprocessor, a ROM, a RAM, a hard disk unit, a keyboard for the input of instructions, a mouse, and a display unit composed of an LCD, a CRT, or the like. A computer program is stored in the RAM or the hard disk unit. The address book server 200 achieves the functions described below in the functional structure as the microprocessor operates in accordance with the computer program.

Functional Structure

Figure 3:
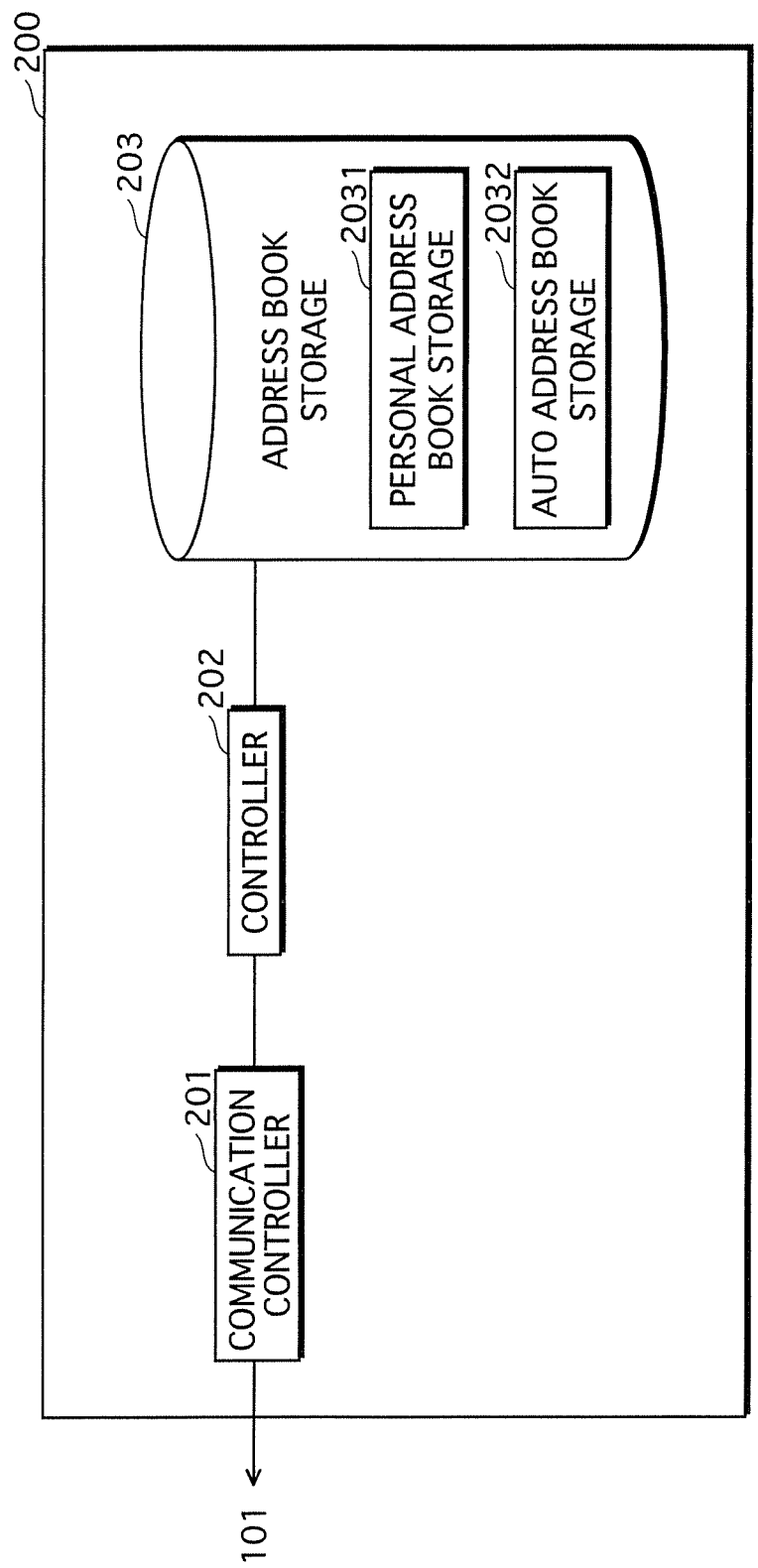
FIG. 3 is a functional block diagram showing the functional structure of an address book server 200.

FIG. 3 is a functional block diagram showing the functional structure of the address book server 200.

The address book server 200 is constituted from a communication controller 201, a controller 202, and an address book storage 203.

Communication Controller 201

The communication controller 201 is an interface for connecting to the LAN 101. The communication controller 201 controls communication with the constituent elements of the image transmission system 1000. The communication control is performed using a predetermined protocol such as TCP/IP.

Address Book Storage 203

The address book storage 203 is constituted from a personal address book storage 2031 and an auto address book storage 2032.

Personal Address Book Storage 2031

The personal address book storage 2031 stores personal address books configured by users of the image transmission system 1000.

"Personal address book" refers to information including setter information, destination setting information, and recipient setting information "Setter information" refers to information that identifies the person who configured the personal address book (e.g., the name of the setter).

"Recipient setting information" refers to information including recipient specification information, transmission condition designation information, and display mode designation information designated by the setter of the personal address book. The transmission condition designation information is also designated by the setter of the personal address book and indicates a destination and a transmission method for image data addressed to the setter.

"Recipient specification information" refers to information specifying the setter of the personal address book, who is the recipient, and is displayed on the display 1171 of the image transmission device 100 used by the sender when transmitting image data to the setter. "Recipient specification information" specifically refers to information such as a recipient name, a recipient ID, a nickname, a face image, and the like.

"Transmission condition designation information" refers to information indicating a destination and a transmission method designated by the setter in the later-described recipient setting registration processing.

"Display mode designation information" refers to information designating a display mode (hereinafter, called the "designated display mode") in which the recipient specification information and transmission condition designation information are to be displayed on the display 1171 of the image transmission device 100 used by the sender when transmitting image data to the setter.

There are three possible designated display modes, namely "unrestricted", "all restricted", and "individual restricted". "Unrestricted" is a display mode in which the content of the recipient specification information and the transmission condition designation information is displayed in a predetermined default display mode (e.g., a display mode in which all of the recipient specification information and transmission condition designation information is displayed, or a display mode in which the display of predetermined items such as the face image and nickname is restricted). "All restricted" is a display mode in which part of the recipient specification information and transmission condition designation information is not displayed, regardless of the image data sender. "Individual restricted" is a display mode in which recipient specification information and transmission condition designation information items whose display is restricted are specified on a sender-by-sender basis.

FIG. 4 shows a concrete example of the recipient setting information. In the recipient specification information of FIG. 4, "GK" is indicated as the recipient name, "111998" is indicated as the recipient ID, "Gori" is indicated as the nickname, and a storage location address (in the registered authentication information storage 112) of face image data is designated. In the transmission condition designation information of FIG. 4, "E-mail" is designated as the transmission method and "ddd@jjj.ne.jp" is designated as the destination. In the display mode designation information of FIG. 4, "individual restricted" is designated as the designated display mode, and display states for the items "recipient name", "recipient ID", "nickname", "face image", "transmission method", and "destination" are designated for the senders person A, person B, person C, and person H.

In FIG. 4, "○" (a circle) indicates that the display of the corresponding information is not restricted when transmitting image data, and "x" (an X) indicates that the display of the corresponding information is restricted (either not displayed or displayed as masked characters such as "****") when transmitting image data.

Figure 5:
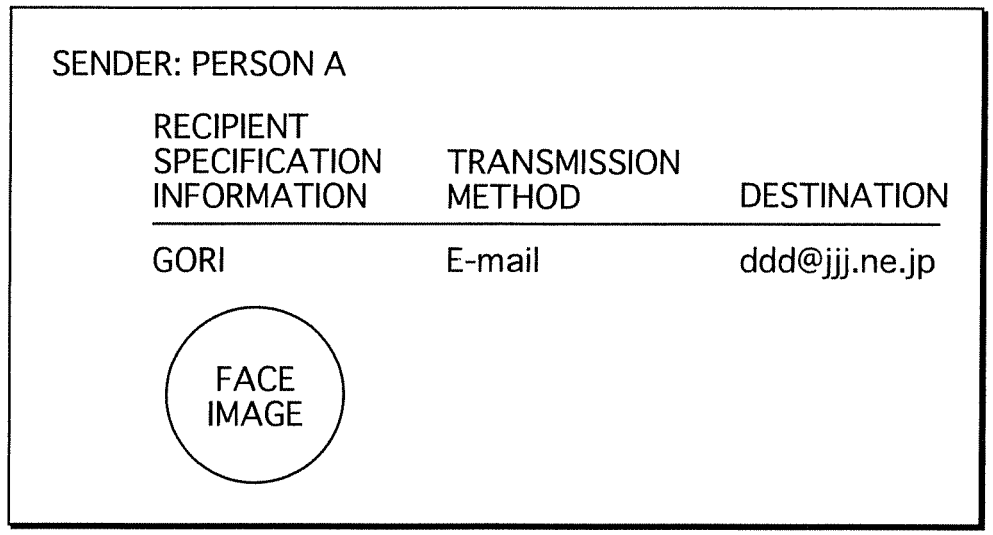
FIG. 5 shows an exemplary display 1 of recipient specification information and transmission condition designation information, based on display mode designation information.

For example, if the sender is "person A", since the display of the recipient name and recipient ID is restricted and the display of the nickname, face image, transmission method, and destination is not restricted in the display mode designation information, the display on the display 1171 when "person A" transmits image data is as shown in FIG. 5.

Figure 6:
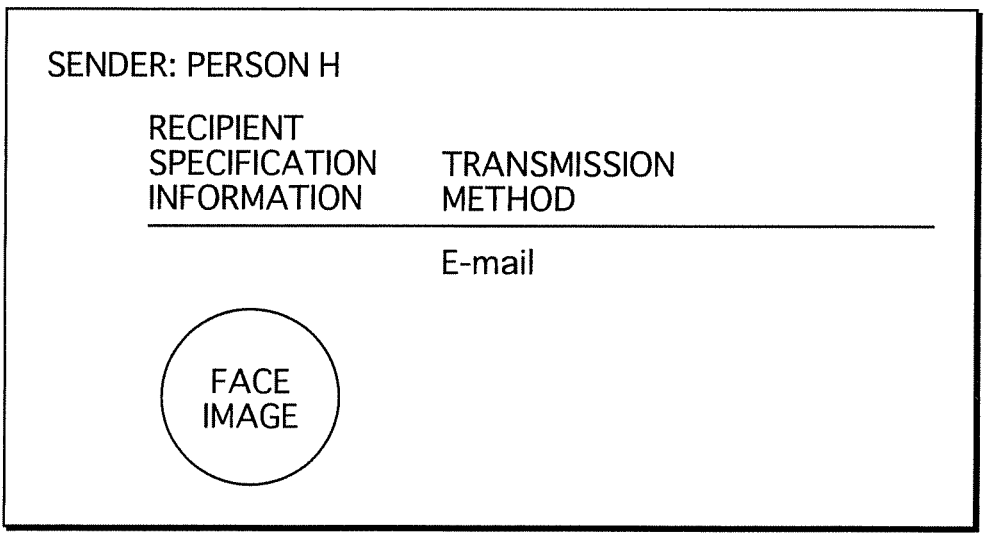
FIG. 6 shows an exemplary display 2 of recipient specification information and transmission condition designation information, based on display mode designation information.

If the sender is "person H", since the display of all items other than the face image and transmission method is restricted in the display mode designation information, the display on the display 1171 when "person H" transmits image data is as shown in FIG. 6.

"Recipient setting information" is only included in the personal address book if the setter of the personal address book has configured the recipient setting information. "Recipient setting information" is not included in the personal address book if the setter of the personal address book has not configured the recipient setting information.

If the recipient setting information has not been configured, the recipient specification information and transmission condition designation information are displayed in the default display mode when image data is transmitted.

"Destination setting information" refers to information indicating a recipient name for image data and a transmission method and destination for transmitting image data to the recipient.

There are two ways of setting the transmission method and destination in the destination setting information. The first involves the user inputting both the transmission method and the destination, and the second involves the user designating information (hereinafter, called the "auto setting information") which indicates a transmission method and destination that are indicated in the recipient setting information included in the personal address book of another user (hereinafter, this way is called "auto setting"). The user registers destination setting information either of these ways in the later-described personal address book registration processing.

FIGS. 7A and 7B show concrete examples of personal address books. FIG. 7A shows a personal address book whose setter is "person A" (indicated in the setter information), and FIG. 7B shows a personal address book whose setter is "person GK" (indicated in the setter information).

In person A's personal address book, "auto setting information" is indicated in correspondence with the recipient "person GK", thereby designating the transmission method, destination, and display modes for the recipient specification information and transmission condition designation information that are indicated in the recipient setting information (the portion indicated by 401) of person GK's personal address book shown in FIG. 7B.

Note that the specific content of the recipient setting information indicated by 401 is shown in FIG. 4.

Accordingly, in the later-described image transmission processing, when image data is transmitted to "person GK" using person A's personal address book, the image data is transmitted in accordance with the transmission method and destination that are indicated in the recipient setting information 401 registered in person GK's personal address book shown in FIG. 7B.

Also, as shown in FIG. 5, the recipient specification information and transmission condition designation information are displayed on the display 1171 during image data transmission, in accordance with the display mode designated in the display mode designation information pertaining to "person A" in the recipient setting information of "person GK" shown in FIG. 4.

Auto Address Book Storage 2032

Returning now the description of FIG. 3, the auto address book storage 2032 stores an auto address book. "Auto address book" refers to a list of setters who have configured recipient setting information in their personal address book (hereinafter, called the "reception method setter list").

Controller 202

The controller 202 performs overall control of the address book server 200 and registration management processing for personal address books.

Registration Management Processing

According to the later-described personal address book registration processing, when the controller 202 receives, from the image transmission device 100 via the communication controller 201, a notification of a username and an acquisition request for the personal address book corresponding to the notified username, the controller 202 acquires, from the personal address book storage 2031, the personal address book whose setter indicated in the setter information matches the notified user name and transmits, via the communication controller 201, the acquired personal address book to the image transmission device 100 that transmitted the acquisition request.

Also, in the later-described personal address book registration processing, each time the image transmission device 100 creates or updates a personal address book, the controller 202 acquires the created or updated personal address book from the image transmission device 100 via the communication controller 201, and records the acquired personal address book in the personal address book storage 2031. Here, in each instance of acquiring a personal address book from the image transmission device 100, the controller 202 judges whether a personal address book that includes the same setter information as the setter information of the acquired personal address book is stored in the personal address book storage 2031. If the judgment is affirmative, the controller 202 overwrites the stored personal address book (i.e., the un-updated personal address book) with the updated personal address book. If the judgment is negative, that is to say, if the acquired personal address book has been newly created, the controller 202 records the acquired personal address book in the personal address book storage 2031.

Also, at a predetermined time interval, the controller 202 searches the personal address books stored in the personal address book storage 2031, extracts the setter information from the personal address books that include recipient setting information, creates an auto address book, and records the created auto address book in the auto address book storage 2032.

Accordingly, the previously created auto address book is updated with a most-up-to-date auto address book at a predetermined time interval.

Operations

Personal Address Book Registration Processing

FIG. 10 is a flowchart showing operations in personal address book registration processing performed by the controller 119. The following describes such operations with reference to FIG. 10.

Upon receiving, via the operation panel 117, an instruction from a user to execute personal address book registration processing, the controller 119 starts the computer program related to such processing (step S1001), causes the LCD 1171 of the operation panel 117 to display a GUI (Graphic User Interface) display screen for receiving the input of authentication information from the user, and requests the input of authentication information (step S1002).

Upon receiving, via the operation panel 117, the username and password of the user as the authentication information, the controller 119 executes authentication processing by acquiring, from the registered authentication information storage 112, registered authentication information that corresponds to the received username and comparing the registered authentication information and the received authentication information (step S1003), and judges whether the user is authenticated (step S1004).

If the user is authenticated when the received authentication information and registered authentication information are matched (step S1004:Y), the controller 119 causes the LCD 1171 of the operation panel 117 to display a GUI selection screen for causing the user to select whether to register a new personal address book or update their personal address book, and requests the user to select a registration method. If "new registration" is selected (step S1018:Y), the controller 119 creates a new personal address book whose setter information indicates the authenticated username (step S1019). If "update" is selected (step S1018:N) is selected, the controller 119 notifies, via the communication controller 110, the received user name to the address book server 200, requests the auto address book and personal address book that corresponds to the notified username, and acquires, from the address book server 200, the auto address book and the personal address book whose setter information matches the notified username (step S1005).

Figure 17:
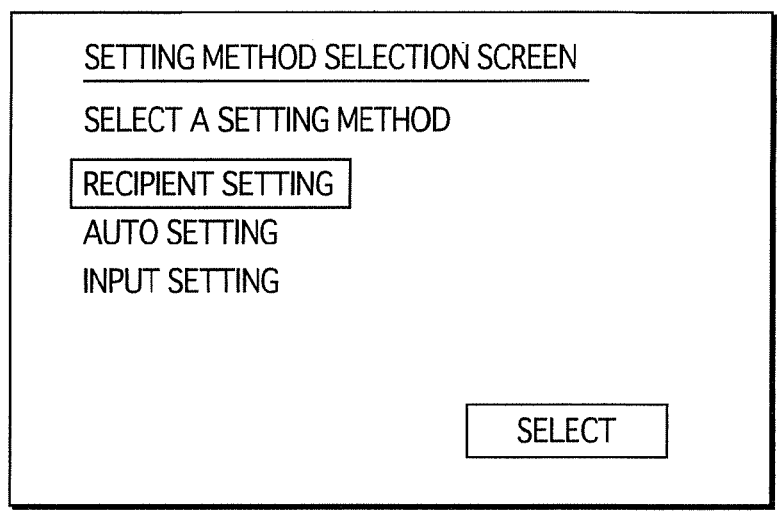
FIG. 17 shows a concrete example of a setting method selection screen.

Next, the controller 119 causes the LCD 1171 of the operation panel 117 to display a GUI setting method selection screen such as shown in FIG. 17 (step S1006), and requests the user to select a setting method.

Figure 8:
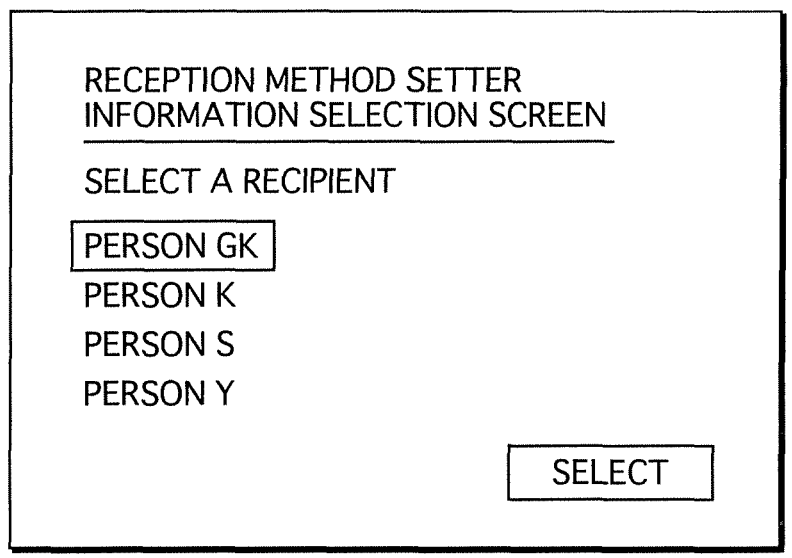
FIG. 8 shows a concrete example of a reception method setter selection screen.

If "recipient setting" is selected (step S1007:Y) the controller 119 performs the later-described recipient setting registration processing (step S1008). If "auto setting is selected (step S1007:N, step S1009:Y), the controller 119 causes the LCD 1171 of the operation panel 117 to display a GUI reception method setter selection screen such as shown in FIG. 8 (step S1010), and requests the user to select a reception method setter as a target for the "auto setting".

Upon receiving the selection of a reception method setter from the user via the operation panel 117 (step S1011), the controller 119 registers, in the acquired or created personal address book, auto setting information pertaining to the selected reception method setter (step S1012).

As a result of registering the auto setting information, the transmission method, destination, and display mode for the recipient specification information and transmission condition designation information that are indicated in the recipient setting information included in the personal address book of the selected reception method setter are designated as the transmission method and destination for the transmission of image data to the selected reception method setter and the display mode for the recipient specification information and transmission condition designation information pertaining to the selected reception method setter.

If "input setting" is selected instead of "auto setting" in step S1009 (step S1009:N), the controller 119 causes the LCD 1171 of the operation panel 117 to display a GUI registration information input screen enabling the user to register destination setting information in the personal address book (step S1013). Upon receiving, via the input screen, the input of a recipient name and a transmission method and destination for the recipient (step S1014), the controller 119 creates destination setting information based on the input information, and registers the created destination setting information in the personal address book (step S1015).

After performing the processing of step S1008, S1012, or S1015, if an instruction to end the personal address book registration processing is received from the user via the operation panel 117 (step S1016:Y), the controller 119 ends the processing, and transmits the personal address book in which the destination setting information or recipient setting information was registered, to the address book server 200 via the communication controller 110 (step S1017). If an instruction to continue the personal address book registration processing is received from the user via the operation panel 117 in step S1016, the controller 119 moves to the processing of step S1006.

Recipient Setting Registration Processing

Figure 11:
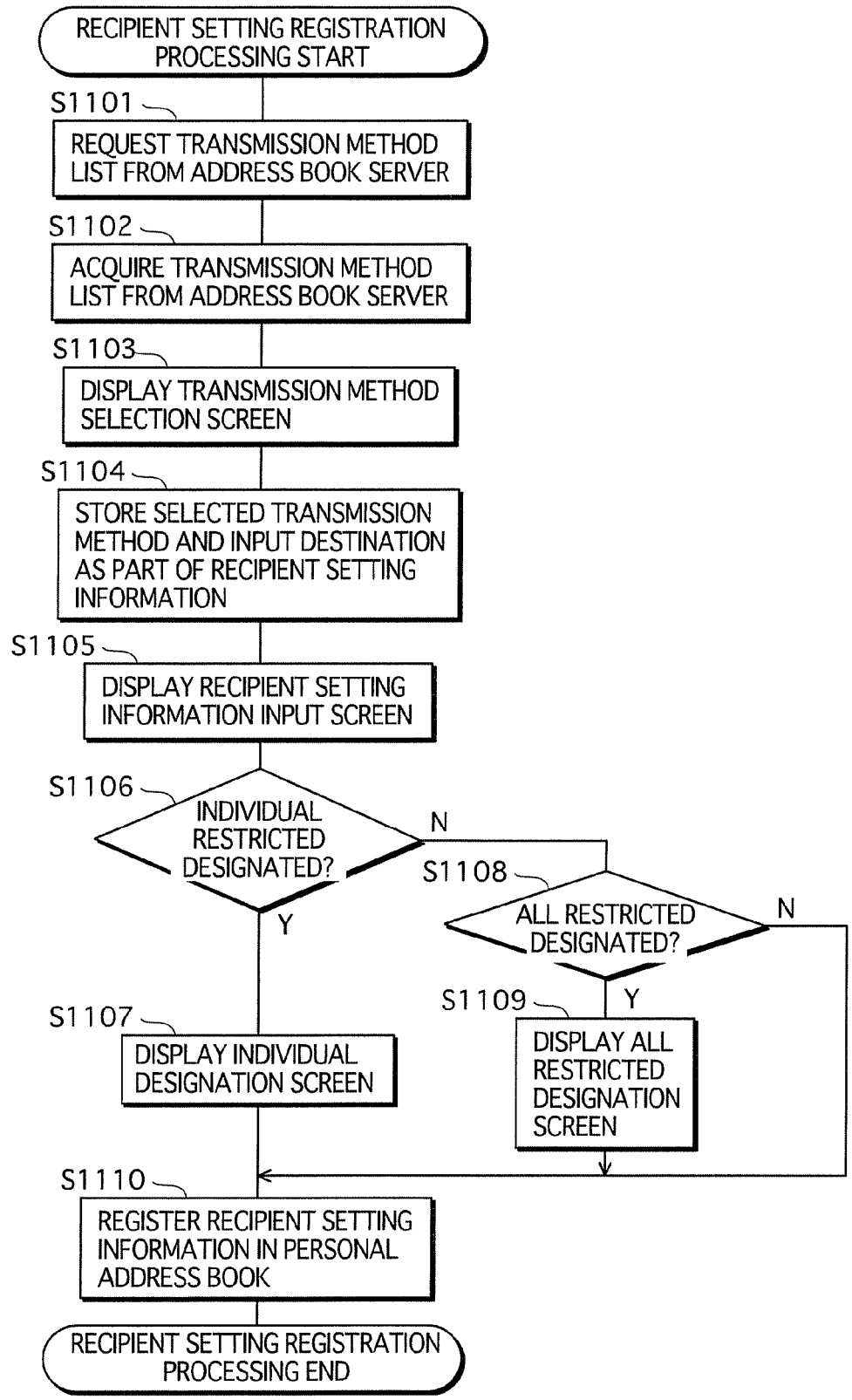
FIG. 11 is a flowchart showing operations in recipient setting registration processing performed by the controller 119.

FIG. 11 is a flowchart showing operations in recipient setting registration processing performed by the controller 119. The following describes such operations with reference to FIG. 11.

If "recipient setting" is selected (step S1007:Y) in the personal address book registration processing of FIG. 10, the controller 119 requests, via the communication controller 110, a transmission method list from the address book server 200 (step S1101), and acquires the transmission method list from the address book server 200 (step S1102). The controller 119 causes the LCD 1171 of the operation panel 117 to display, based on the acquired transmission method list, a GUI transmission method selection screen such as shown in FIG. 18 (step S1103), and requests the user to select a transmission method and input a destination.

Figure 18:
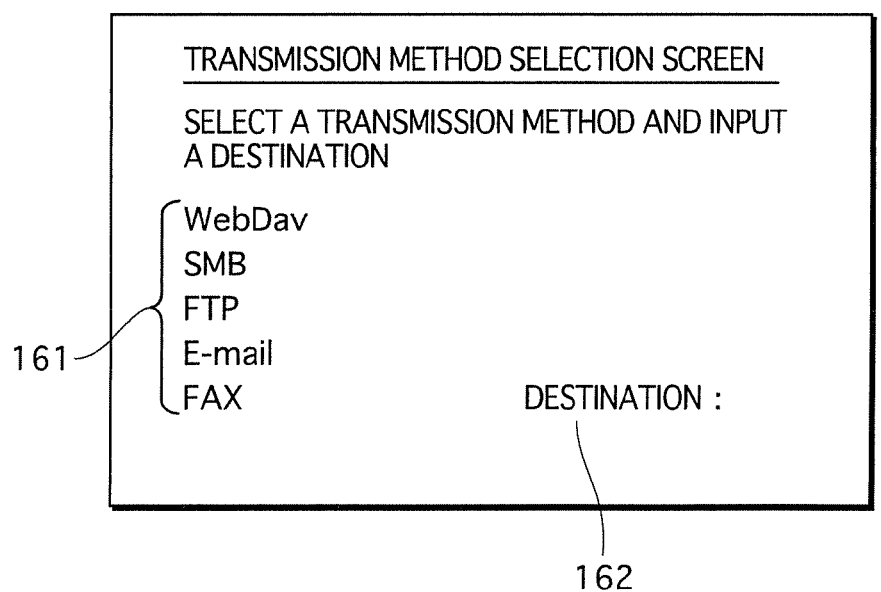
FIG. 18 shows a concrete example of a transmission method selection screen.

The "transmission method selection screen" is a screen composed of the transmission method selection screen showing the transmission method list (the portion indicated by 161 in FIG. 18), and an input screen for the destination to be used in the selected transmission method (the portion indicated by 162 in FIG. 18).

After the user has selected a transmission method on the transmission method selection screen and input a destination to be used in the selected transmission method via the operation panel 117, the controller 119 stores the selected transmission method and input destination as part of the recipient setting information (step S1104), causes the display of a GUI recipient setting information input screen such as shown in FIG. 19A (step S1105), and requests the user to input recipient specification information and select a designated display mode to be indicated in the display mode designation information.

Upon the user inputting recipient specification information via the input screen and selecting "individual restricted" as shown in FIG. 19A (step S1106:Y), the controller 119 causes the display of the GUI individual designation screen shown in FIG. 19B (step S1107), and requests the user to input display mode designation information for designated individuals. Upon receiving the input of the display mode designation information via the individual designation screen, the controller 119 registers the resulting recipient setting information in the personal address book (step S1110).

If "individual restricted" is not selected in step S1106 (step S1106:N), and "all restricted" is selected instead (step S1108:Y), the controller 119 causes the display of the GUI all restricted designation screen shown in FIG. 19C (step S1109), and requests the user to input display mode designation information to be applied to all persons. Upon receiving the input of the display mode designation information via the all restricted designation screen, the controller 119 registers the resulting recipient setting information in the personal address book (step S1110).

If "unrestricted" is selected instead of "all restricted" in step S1108 (step S1108:N), the controller 119 moves to the processing of step S1110.

Image Transmission Processing

Figure 12:
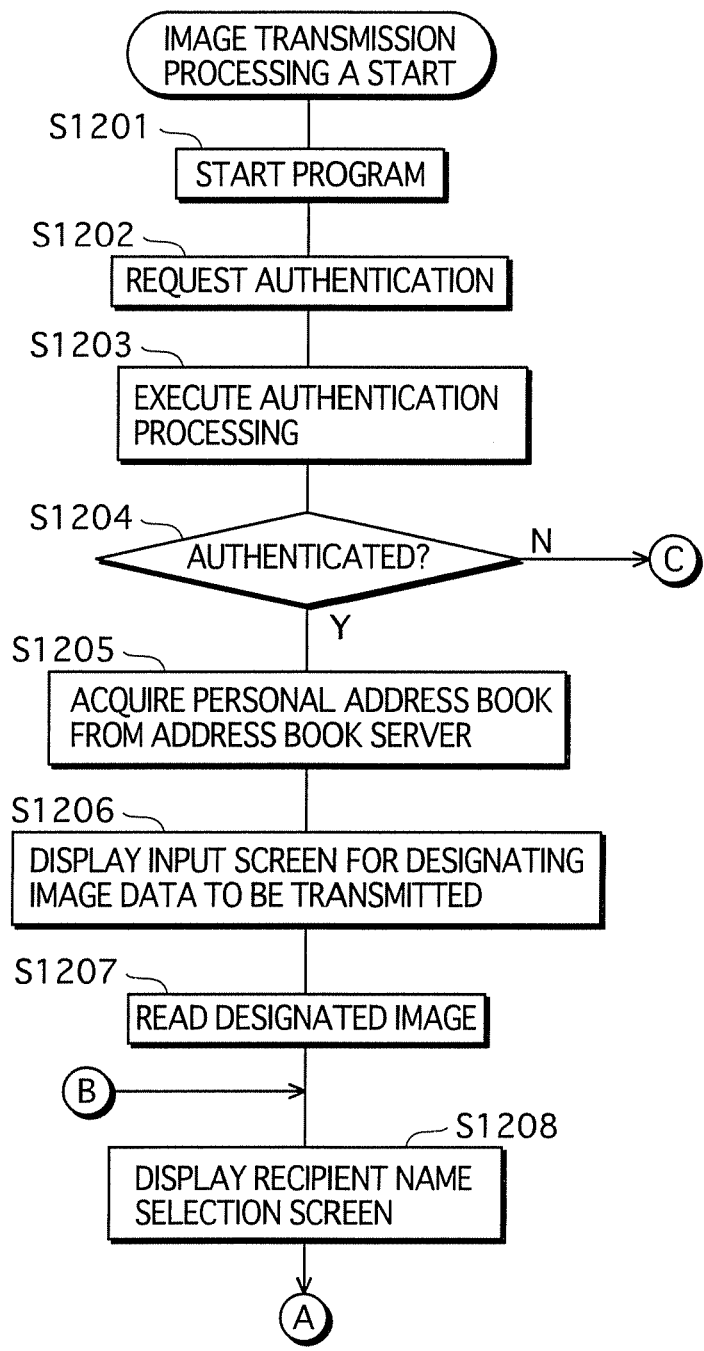
FIG. 12 is a flowchart showing operations in image transmission processing A performed by the controller 119.
Figure 13:
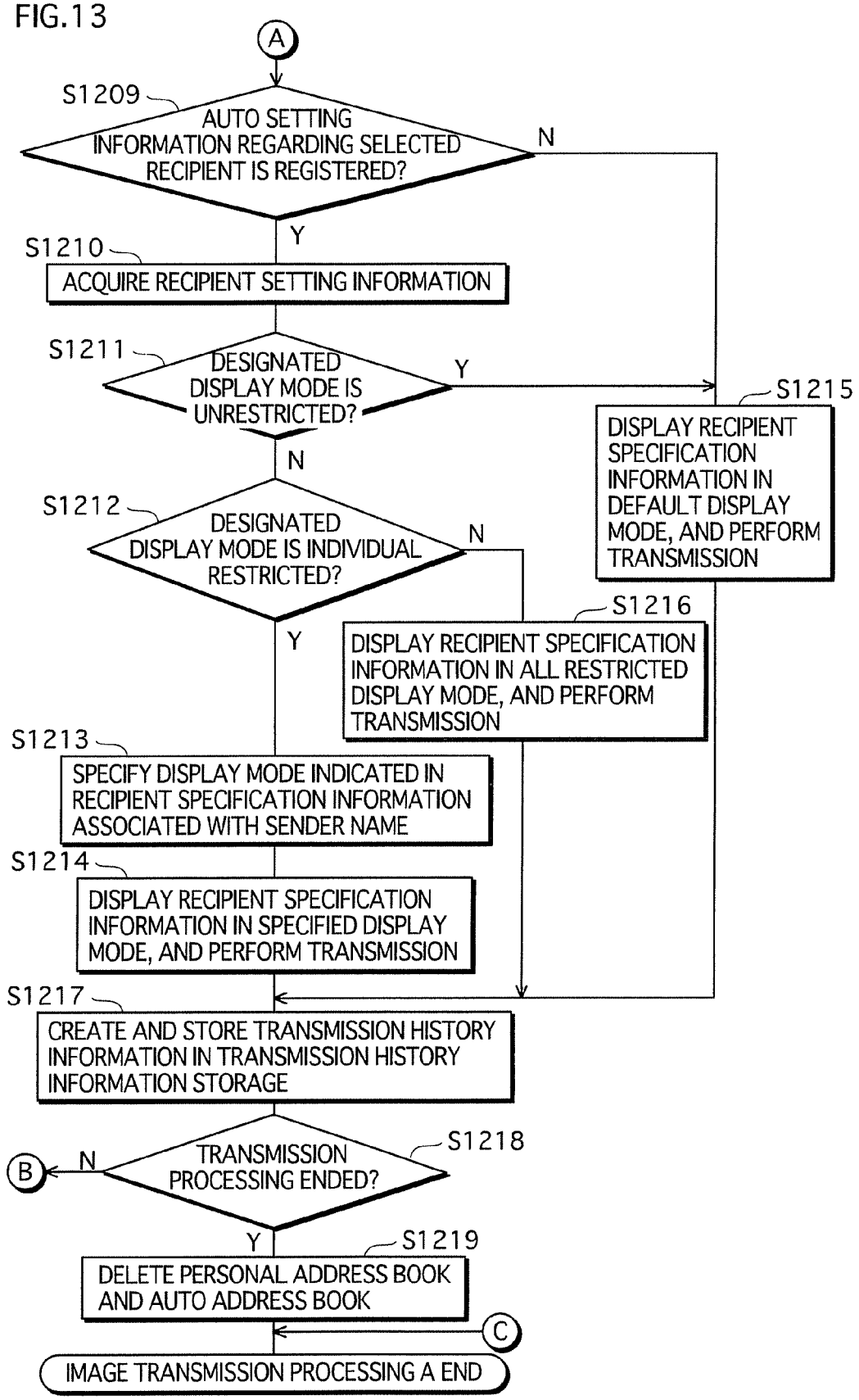
FIG. 13 is a flowchart showing operations in image transmission processing A performed by the controller 119.

FIGS. 12 and 13 are flowcharts showing operations in image transmission processing A performed by the controller 119. The following describes such operations with reference to FIGS. 12 and 13.

Upon receiving, via the operation panel 117, an instruction from the user to execute image transmission processing A, the controller 119 starts the computer program related to such processing (step S1201), causes the LCD 1171 of the operation panel 117 to display a GUI display screen for receiving the input of authentication information from the user, and requests the user to input authentication information (step S1202).

Upon receiving, via the operation panel 117, the username and password of the user as the authentication information, the controller 119 executes authentication processing by acquiring, from the registered authentication information storage 112, registered authentication information that corresponds to the received username and comparing the registered authentication information and the received authentication information (step S1203), and judges whether the user is authenticated (step S1204).

If the user is authenticated when the received authentication information and registered authentication information are matched (step S1204:Y), the controller 119 notifies, via the communication controller 110, the received username to the address book server 200, requests the personal address book that corresponds to the notified username, and acquires, from the address book server 200, the requested personal address book (step S1205). Thereafter, the controller 119 causes the LCD 1171 of the operation panel 117 to display a GUI input screen for designating image data to be transmitted (step S1206). Upon the user designating image data to be transmitted on the designation input screen, the controller 119 reads the designated image data from the image storage 111 (step S1207), creates a recipient name selection screen such as shown in FIG. 20 based on the acquired personal address book, causes the LCD 1171 of the operational panel 117 to display the created GUI recipient name selection screen (step S1208), and requests the user to select a recipient name.

FIG. 20 shows a concrete example of the recipient name selection screen that has been created based on person A's personal address book shown in FIG. 7A.

Upon receiving a user selection of a recipient name on the recipient name selection screen via the operation panel 117, the controller 119 judges, with reference to the acquired personal address book, whether information pertaining to the selected recipient name is registered in the auto setting information (step S1209).

If information pertaining to the selected recipient name is registered in the auto setting information (step S1209:Y), the controller 119 notifies, via the communication controller 110, the selected recipient name to the address book server 200, requests the recipient setting information registered in the personal address book corresponding to the selected recipient name, and acquires the requested recipient setting information from the address book server 200 (step S1210). The controller 119 judges whether the designated display mode indicated in the display mode designation information included in the acquired recipient setting information is "unrestricted", "individual restricted", or "all restricted" (step S1211, step S1212). In the case of "unrestricted" (step S1211:Y), the controller 119 causes the LCD 1171 to display the recipient specification information and transmission condition designation information indicated in the recipient setting information in the default display mode, and transmits the image data to the destination indicated in the recipient setting information by the transmission method indicated in the recipient setting information (step S1215). In the case of "individual restricted" (step S1211:N, step S1212:Y), the controller 119 specifies a display mode associated with the authenticated sender name with reference to the display mode designation information indicated in the recipient setting information (step S1213), causes the LCD 1171 to display the recipient specification information and transmission condition designation information indicated in the recipient setting information in the specified display mode, and transmits the image data to the destination indicated in the recipient setting information by the transmission method indicated in the recipient setting information (step S1214). In the case of "all restricted" (step S1211:N, step S1212:N), the controller 119 causes the LCD 1171 to display the recipient specification information and transmission condition designation information indicated in the recipient setting information in the all restricted display mode that is designated in the display mode designation information indicated in the recipient setting information, and transmits the image data to the destination indicated in the recipient setting information by the transmission method indicated in the recipient setting information (step S1216).

If information pertaining to the selected recipient name is not registered in the auto setting information (step S1209:N), the controller 119 moves to the processing of step S1215.

After the processing of steps S1214, S1215, and S1216, the controller 119 creates transmission history information regarding the transmission performed in the above processing, records the created transmission history information in the transmission history information storage 120 (step S1217), and causes the LCD 1171 of the operation panel 117 to display a GUI continuation instruction input screen for requesting the user to input an instruction regarding whether to continue transmission processing. If a continuation instruction is received (step S1218:N), the controller 119 moves to the processing of step S1208. If a non-continuation instruction is received (step S1218:Y) the controller deletes the acquired personal address book and auto address book (step S1219).

Transmission History Display Processing

Figure 14:
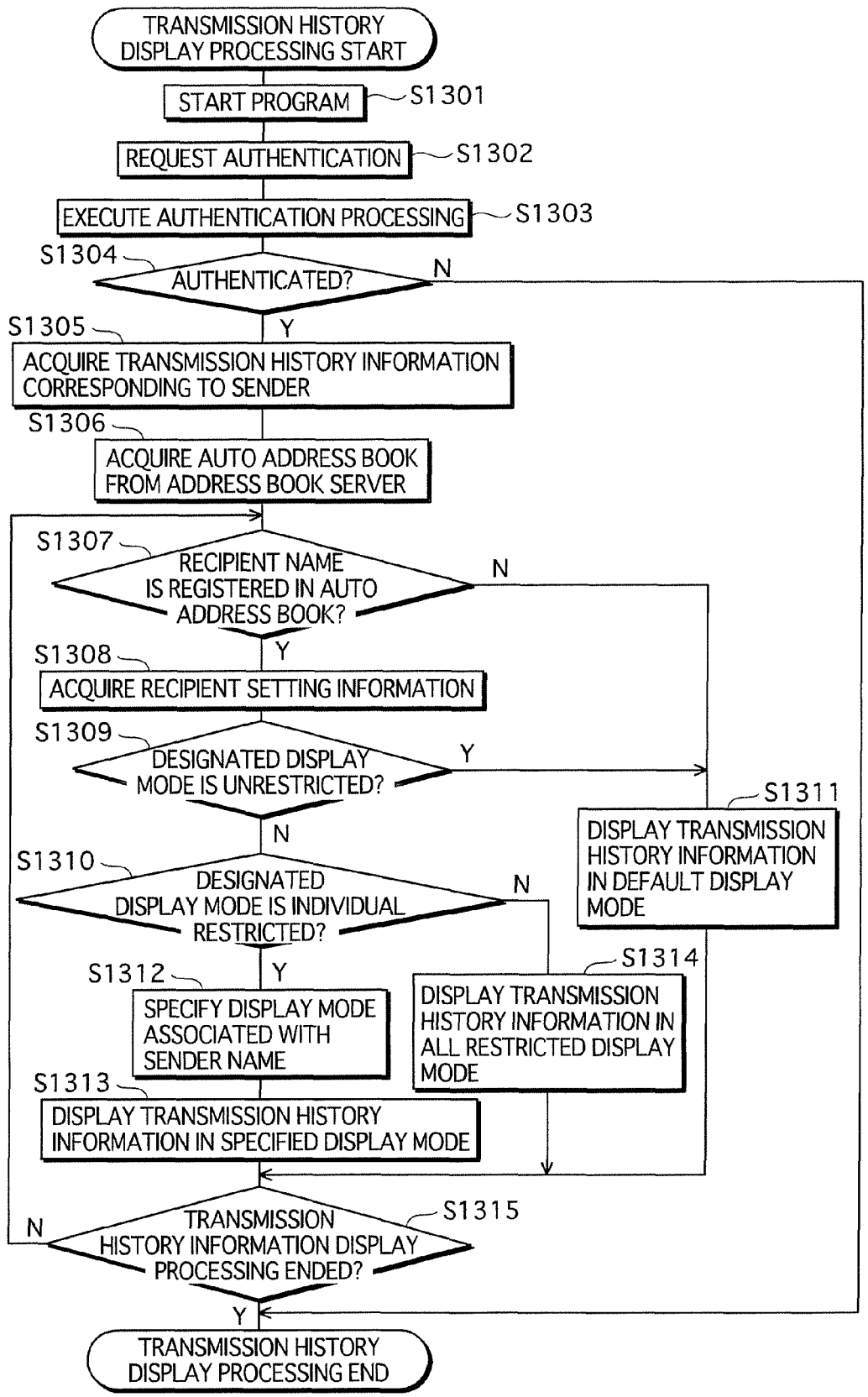
FIG. 14 is a flowchart showing operations in transmission history display processing performed by the controller 119.

FIG. 14 is a flowchart showing operations in transmission history display processing performed by the controller 119. The following describes such operations with reference to FIG. 14.

Upon receiving, via the operation panel 117, an instruction from the user to execute transmission history display processing, the controller 119 starts the computer program related to such processing (step S1301), and causes the LCD 1171 of the operation panel 117 to display a GUI display screen for receiving the input of authentication information from the user, and requests the user to input authentication information (step S1302).

Upon receiving, via the operation panel 117, the username and password of the user as the authentication information, the controller 119 executes authentication processing by acquiring, from the registered authentication information storage 112, registered authentication information that corresponds to the received username and comparing the registered authentication information and the received authentication information (step S1303), and judges whether the user is authenticated (step S1304).

If the user is authenticated when the received authentication information and registered authentication information are matched (step S1304:Y), the controller 119 acquires transmission history information corresponding to the authenticated sender name from the transmission history information storage 120 (step S1305). Furthermore, the controller 119 requests, via the communication controller 110, the auto address book from the address book server 200, acquires the requested auto address book from the address book server 200 (step S1306), and judges whether the recipient name included in the acquired transmission history information is registered in the auto address book (step S1307).

If the recipient name is registered in the auto address book (step S1307:Y), the controller 119 notifies, via the communication controller 110, the recipient name to the address book server 200, requests the recipient setting information registered in the personal address book corresponding to the recipient name, and acquires the requested recipient setting information from the address book server 200 (step S1308). The controller 119 judges whether the designated display mode indicated in the display mode designation information included in the acquired recipient setting information is "unrestricted", "individual restricted", or "all restricted" (step S1309, step S1310). In the case of "unrestricted" (step S1309:Y), the controller 119 causes the LCD 1171 to display the transmission history information while displaying the recipient specification information and transmission condition designation information indicated therein in the default display mode (step S1311). In the case of "individual restricted" (step S1309:N, step S1310:Y), the controller 119 specifies a display mode associated with the authenticated sender name with reference to the display mode designation information indicated in the recipient setting information (step S1312), and causes the LCD 1171 to display the transmission history information while displaying the recipient specification information and transmission condition designation information indicated therein in the specified display mode (step S1313). In the case of "all restricted" (step S1309: N, step S1310:N), the controller 119 causes the LCD 1171 to display the transmission history information while displaying the recipient specification information and transmission condition designation information indicated therein in the all restricted display mode that is designated in the display mode designation information indicated in the recipient setting information (step S1314).

If the recipient name is not registered in the auto address book in step S1307 (step S1307:N), the controller 119 moves to the processing of step S1311.

After the processing of steps S1311, S1313, and S1314, the controller 119 judges whether the display processing pertaining to all of the transmission history information associated with the authenticated sender name has ended (step S1315). If the display processing has ended (step S1315:Y), the controller 119 ends the transmission history display processing. If the display processing has not ended (step S1315:N), the controller 119 moves to the processing of step S1307.

FIGS. 9A and 9B show concrete examples of transmission history information displayed by the display 1171 as a result of the transmission history display processing.

Specifically, the concrete examples of FIGS. 9A and 9B show transmission history information for transmitted image data in which the recipient is "person GK", who registered the recipient setting information shown in FIG. 4. FIG. 9A shows a concrete example in which "person A" is the sender, and FIG. 9B shows a concrete example in which "person H" is the sender.

In the display mode designation information indicated in the recipient setting information of FIG. 4, the display of "recipient name" and "recipient ID" is restricted for "person A". Therefore, from among the various pieces of information in the recipient specification information, only the recipient's nickname (Gori) and face image, and not the recipient name or recipient ID, are displayed in FIG. 9A.

On the other hand, only the display of "face image" and "transmission method" are permitted for "person H" in the display mode designation information indicated in the recipient setting information of FIG. 4. Therefore, among the various pieces of information in the recipient specification information, only the recipient's face image, and not the nickname, recipient name, or recipient ID, are displayed in FIG. 9B, as well as from among the various pieces of information in the transmission condition designation information, only the transmission method, and not the destination.

Supplementary Remarks

Although an image transmission system 1000 of the present invention has been described based on the embodiment, the present invention is of course not limited to the above embodiment.

(1) For example in the embodiment, the display mode for the recipient specification information to be displayed on the LCD 1171 when transmitting image data in the image transmission processing is controlled in accordance with the display mode designation information indicated in the recipient setting information, but this is true only if in the personal address book registration processing, when registering a transmission method and destination in a personal address book for the transmission of the image data to a recipient, the person performing the registration selects auto setting information for the recipient (see step S1012 of FIG. 10). However, if the recipient has registered recipient setting information in his/her personal address book, such recipient setting information may be given priority regardless of whether the person performing the registration selects auto setting information for the recipient, and the display mode for the recipient specification information may be controlled in accordance with the display mode designation information indicated in the recipient setting information registered by the recipient.

Figure 15:
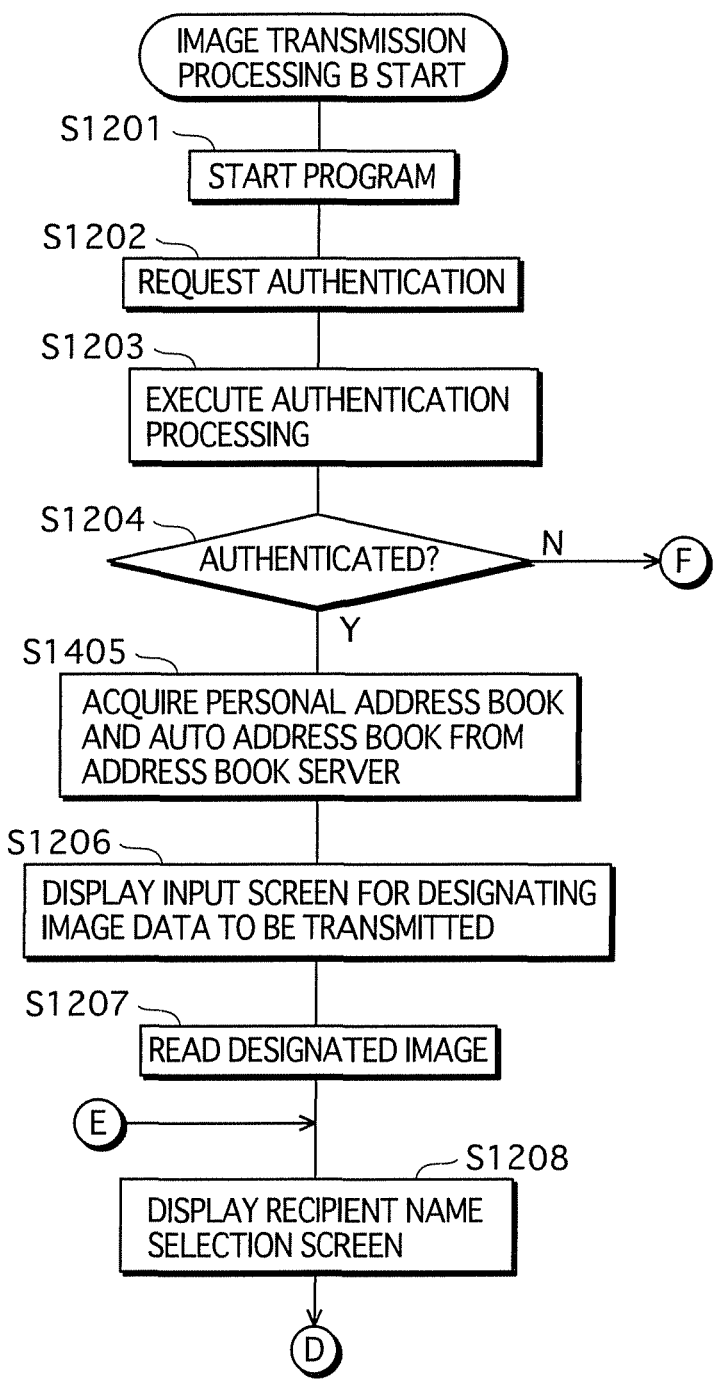
FIG. 15 shows operations in image transmission processing B performed by the controller 119.
Figure 16:
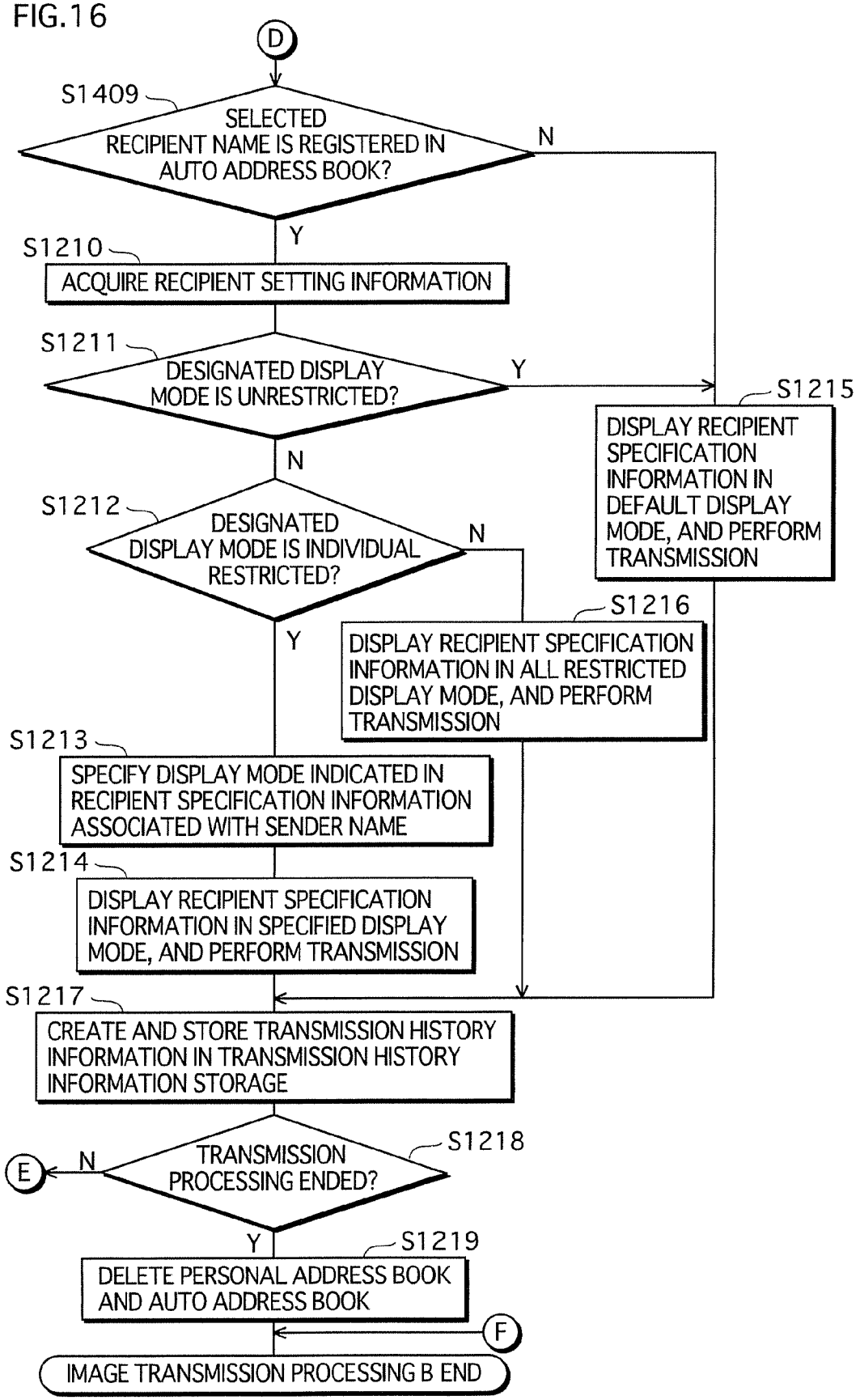
FIG. 16 shows operations in image transmission processing B performed by the controller 119.

Specifically, image transmission processing B may be performed as shown in the flowcharts of FIGS. 15 and 16. FIGS. 15 and 16 show operations in image transmission processing B performed by the controller 119. In FIGS. 15 and 16, processing that is the same as in the image transmission processing A shown in FIGS. 12 and 13 have been given the same step numbers as in FIGS. 12 and 13, and processing that differs from the image transmission processing A has been given different step numbers. The following description focuses on the operations that differ from the image transmission processing A.

After the processing of steps S1201 to S1204, if the authentication is successful (step S1204:Y), the controller 119 notifies, via the communication controller 110, the received username to the address book server 200, requests the auto address book and personal address book corresponding to the notified username, and acquires the auto address book and personal address book from the address book server 200 (step S1405). After the processing of steps S1206 to S1208, the controller 119 judges whether the selected recipient is registered in the auto address book (step S1409) If the selected recipient is registered (step S1409:Y), the controller moves to the processing of step S1210, and if the selected recipient is not registered (step S1409:N), the controller 119 moves to the processing of step S1215, and thereafter performs the same processing as shown in FIG. 12 (steps S1211 to S1214, S1215, and S1216).

Accordingly, if the recipient has registered recipient setting information in his/her personal address book, the recipient's intentions are given priority. Therefore, the recipient can update the recipient setting information as necessary, thereby eliminating the trouble of sending a notification each time the recipient's information changes, and enabling the recipient to easily, and in line with the recipient's intentions, control the display mode for the recipient specification information when image data is transmitted to the recipient.

(2) Also, in image transmission processing A and B, when image data is to be transmitted based on recipient setting information, if faxing via a telephone line has been set as the transmission method in the recipient setting information, information regarding an estimate of the charge for the fax transmission (e.g., information indicating the destination region, such as a region name, postal code, or area code) may be displayed on the display 1171 of the image transmission device 100, regardless of the display mode designated in the display mode designation information indicated in the recipient setting information. FIG. 21 shows an exemplary display in a case in which the display of information other than the transmission method is restricted in the display mode designation information (here, the sender is person H).

Specifically, in the recipient setting registration processing shown in FIG. 11, if the transmission method input via the transmission method selection screen is "FAX", the user may be caused to input information indicating the region of the destination, the input information may be included in the recipient setting information and registered in the personal address book. Therefore, when image data is transmitted based on such recipient setting information, information indicating the destination region can be displayed on the LCD 1171 to give an estimate of the charge.

Accordingly, even if the recipient has restricted the display of the destination phone number, the sender can find out the destination region and obtain an estimate of the transmission charge.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image transmission system including a server and an image transmission device that are connected via a network, the server providing recipient information which includes recipient specification information that specifies a recipient, and a transmission method and a destination for transmission of image data to the recipient, the server comprising:
a recording medium;
a registration/update reception unit operable to receive recipient information and display mode designation information for registration or updating, the display mode designation information designating a display mode for setting display items for the recipient information, and the recipient information and the display mode designation information having been designated by the recipient; and
a recording controller operable to, (i) upon reception of the recipient information and display mode designation information for registration, record the recipient information and display mode designation information for registration to the recording medium in association with a recipient identifier that identifies the recipient who designated the recipient information and display mode designation information for registration, and (ii) upon reception of the recipient information and display mode designation information for updating, to overwrite the recipient information and display mode designation information recorded to the recording medium in association with the recipient identifier, with the recipient information and display mode designation information for updating, and the image transmission device comprising:
a display;
a selection reception unit operable to receive a selection of a recipient identifier selected by a sender from an address book corresponding to the sender;
a determination unit operable to make a determination of whether or not the recipient identifier so selected is able to reference, in the address book, the recipient information and the display mode designation information recorded in the server;
an acquisition unit operable to, if the determination by the determination unit is affirmative, acquire, from the server, the recipient information and display mode designation information associated with the selected recipient identifier;
a transmitter operable to transmit the image data in accordance with the acquired recipient information; and
a display controller operable to control a screen displayed by the display used by the sender to display the recipient information associated with the selected recipient identifier, in accordance with the display mode designated in the display mode designation information associated with the selected recipient identifier.

2. The image transmission system of claim 1, wherein
the display mode designation information includes a plurality of display modes for the recipient information, each being associated with a different sender identifier,
the image transmission device further comprises:
a sender identifier input reception unit operable to receive an input of a sender identifier; and
a display mode specifier operable to, if the selected recipient identifier is recorded in the server in association with recipient information and display mode designation information, specify, from among the plurality of display modes in the acquired display mode designation information, the display mode associated with the input sender identifier, and
the display controller controls the display to display the recipient information associated with the selected recipient identifier, in accordance with the specified display mode.

3. The image transmission system of claim 2, wherein
the image transmission device further comprises:
a history recording medium operable to record therein one or more transmission history information pieces, each including a sender identifier, a recipient identifier, a transmission result, and recipient information;
a display instruction reception unit operable to receive a transmission history information display instruction; and
a judgment unit operable to, upon reception of the transmission history information display instruction, judge whether the recipient identifier indicated in the transmission history information piece that includes the input sender identifier is recorded in the server in association with recipient information and display mode designation information,
if the judgment unit judges affirmatively, the acquisition unit acquires, from the server, the display mode designation information associated with the recipient identifier indicated in the transmission history information piece, and
the display controller controls display of the transmission history information piece such that the recipient information included therein is displayed on the display in accordance with, from among the plurality of display modes in the acquired display mode designation information, the display mode associated with the input sender identifier.

4. An image transmission device connected to a server via a network, the server (i) providing recipient information which includes a transmission method and a destination for transmission of image data to a recipient and recipient specification information that specifies the recipient, and (ii) performing processing for (a) recording, in association with an identifier of the recipient, recipient-designated recipient information and display mode designation information designating a display mode for setting display items for the recipient information, and (b) each time the recipient information and display mode designation information are updated, overwriting the recorded recipient information and display mode designation information with the recipient information and display mode designation information for updating, the image transmission device comprising:
a display;
a selection reception unit operable to receive a selection of a recipient identifier selected by a sender from an address book corresponding to the sender;
a determination unit operable to make a determination of whether or not the recipient identifier so selected is able to reference, in the address book, the recipient information and the display mode designation information recorded in the server;
an acquisition unit operable to, if the determination by the determination unit is affirmative, acquire, from the server, the recipient information and display mode designation information associated with the selected recipient identifier;
a transmitter operable to transmit the image data in accordance with the acquired recipient information; and
a display controller operable to control a screen displayed by the display used by the sender to display the recipient information associated with the selected recipient identifier, in accordance with the display mode designated in the display mode designation information associated with the selected recipient identifier.

5. The image transmission device of claim 4, wherein
the display mode designation information includes a plurality of display modes for the recipient information, each being associated with a different sender identifier,
the image transmission device further comprises:
a sender identifier input reception unit operable to receive an input of a sender identifier; and
a display mode specifier operable to, if the selected recipient identifier is recorded in the server in association with recipient information and display mode designation information, specify, from among the plurality of display modes in the acquired display mode designation information, the display mode associated with the input sender identifier, and
the display controller controls the display to display the recipient information associated with the selected recipient identifier, in accordance with the specified display mode.

6. The image transmission device of claim 5, further comprising:
a history recording medium operable to record therein one or more transmission history information pieces, each including a sender identifier, a recipient identifier, a transmission result, and recipient information;
a display instruction reception unit operable to receive a transmission history information display instruction; and
a judgment unit operable to, upon reception of the transmission history information display instruction, judge whether the recipient identifier indicated in the transmission history information piece that includes the input sender identifier is recorded in the server in association with recipient information and display mode designation information,
if the judgment unit judges affirmatively, the acquisition unit acquires, from the server, the display mode designation information associated with the recipient identifier indicated in the transmission history information piece, and
the display controller controls display of the transmission history information piece such that the recipient information included therein is displayed on the display in accordance with, from among the plurality of display modes in the acquired display mode designation information, the display mode associated with the input sender identifier.

7. An image transmission method used in an image transmission device that includes a display and is connected to a server via a network, the server (i) providing recipient information which includes a transmission method and a destination for transmission of image data to a recipient and recipient specification information that specifies the recipient, and (ii) performing processing for (a) recording, in association with an identifier of the recipient, recipient-designated recipient information and display mode designation information designating a display mode for setting display items for the recipient information, and (b) each time the recipient information and display mode designation information are updated, overwriting the recorded recipient information and display mode designation information with the recipient information and display mode designation information for updating, the image transmission method comprising the steps of:

receiving a selection of a recipient identifier selected by a sender from an address book corresponding to the sender;

determining whether or not the recipient identifier so selected is able to reference, in the address book, the recipient information and the display mode designation information recorded in the server;

if the determination is affirmative, acquiring, from the server, the recipient information and display mode designation information associated with the selected recipient identifier;

transmitting the image data in accordance with the acquired recipient information; and controlling the display used by the sender to display the recipient information associated with the selected recipient identifier, in accordance with the display mode designated in the display mode designation information associated with the selected recipient identifier.

8. The image transmission method of claim 7, wherein the display mode designation information includes a plurality of display modes for the recipient information, each being associated with a different sender identifier, the image transmission method further comprises the steps of:

receiving an input of a sender identifier; and if the selected recipient identifier is recorded in the server in association with recipient information and display mode designation information, specifying, from among the plurality of display modes in the acquired display mode designation information, the display mode associated with the input sender identifier, and in the display control step, the display is controlled to display the recipient information associated with the selected recipient identifier, in accordance with the specified display mode.

9. The image transmission method of claim 8, wherein the image transmission device further comprises:

a history recording medium operable to record therein one or more transmission history information pieces, each including a sender identifier, a recipient identifier, a transmission result, and recipient information, the image transmission method further comprises the steps of:

receiving a transmission history information display instruction; and upon reception of the transmission history information display instruction, judging whether the recipient identifier indicated in the transmission history information piece that includes the input sender identifier is recorded in the server in association with recipient information and display mode designation information, if the judgment unit judges affirmatively, in the acquisition step the display mode designation information associated with the recipient identifier indicated in the transmission history information piece is acquired from the server, and in the display control step, display of the transmission history information piece is controlled such that the recipient information included therein is displayed on the display in accordance with, from among the plurality of display modes in the acquired display mode designation information, the display mode associated with the input sender identifier.

\* \* \* \* \*